United States Patent
Shiau et al.

(10) Patent No.: US 12,429,944 B1
(45) Date of Patent: Sep. 30, 2025

(54) CALIBRATION PARAMETER GENERATING SYSTEM AND METHOD

(71) Applicant: HTC Corporation, Taoyuan (TW)

(72) Inventors: Jia-Yau Shiau, Taoyuan (TW); KuanHsun Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/950,157

(22) Filed: Nov. 17, 2024

(51) Int. Cl.
   *G06F 3/01* (2006.01)
   *G06V 40/20* (2022.01)

(52) U.S. Cl.
   CPC .............. *G06F 3/011* (2013.01); *G06V 40/23* (2022.01)

(58) Field of Classification Search
   CPC ................................. G06F 3/011; G06V 40/23
   See application file for complete search history.

(56) References Cited

U.S. PATENT DOCUMENTS

| | | | |
|---|---|---|---|
| 10,754,379 | B2 | 8/2020 | Liu et al. |
| 2017/0115690 | A1* | 4/2017 | Liu ..................... G02B 27/0172 |
| 2020/0033937 | A1* | 1/2020 | Erivantcev ............. G06T 7/246 |
| 2021/0041476 | A1* | 2/2021 | Kartashov ............ G06F 3/0362 |
| 2023/0326135 | A1* | 10/2023 | Cashman ................ G06F 3/011 |
| | | | 345/419 |
| 2024/0118749 | A1* | 4/2024 | Holinski ................ G06F 3/038 |

\* cited by examiner

*Primary Examiner* — Premal R Patel
(74) *Attorney, Agent, or Firm* — CKC & Partners Co., LLC

(57) ABSTRACT

A calibration parameter generating device and method are provided. The processing device calculates a body posture of a target user based on tracking data of each of the plurality of body parts. The processing device receives a first real-time image of the target user and positioning information of a first calibration device from the first calibration device of the at least one calibration device, and the first real-time image includes at least one first visible wearable device among the at least one wearable device. The processing device generates a calibration parameter corresponding to each the at least one first visible wearable device based on the first real-time image, the positioning information of the first calibration device, and the body posture.

20 Claims, 5 Drawing Sheets

CALIBRATION PARAMETER GENERATING SYSTEM AND METHOD

BACKGROUND

Field of Invention

The present invention relates to a calibration parameter generating system and method. More particularly, the present invention relates to a calibration parameter generating system and method that can correctly generate calibration parameters.

Description of Related Art

In an extended reality (XR) application environment, interactive devices (such as head-mounted displays) need to rely on wearable tracking devices to capture the user's motion.

However, for tracking information with six degrees of freedom, these wearable tracking devices are prone to physical misalignment problems due to long-term wear or user movement, thus making tracking data generated by the wearable tracking devices inaccurate.

Accordingly, if the parameters of the wearable tracking device are not calibrated, the user's interactive behavior in the extended reality may not be able to correctly execute the interactive operation due to inaccurate tracking data, thus reducing the user's service experience.

Accordingly, there is an urgent need for a calibration parameter generating technology that can correctly generate calibration parameters.

SUMMARY

An objective of the present disclosure is to provide a calibration parameter generating system. The calibration parameter generating system comprises at least one wearable device, at least one calibration device, and a processing device, and the processing device is communicatively connected to the at least one wearable device and the at least one calibration device. The at least one wearable device is configured to generate a tracking data corresponding to each of a plurality of body parts of a target user. The processing device calculates a body posture of the target user based on the tracking data of each of the plurality of body parts. The processing device receives, from a first calibration device of the at least one calibration device, a first real-time image including the target user and a positioning information of the first calibration device, and the first real-time image includes at least one first visible wearable device among the at least one wearable device. The processing device generates a calibration parameter corresponding to each the at least one first visible wearable device based on the first real-time image, the positioning information of the first calibration device, and the body posture.

Another objective of the present disclosure is to provide a calibration parameter generating method, which is adapted for use in an electronic system. The electronic system comprises at least one wearable device, at least one calibration device, and a processing device. The processing device is communicatively connected to the at least one wearable device and the at least one calibration device. The at least one wearable device is configured to generate a tracking data corresponding to each of a plurality of body parts of a target user. The calibration parameter generating method comprises the following steps: calculating a body posture of the target user by the processing device based on the tracking data of each of the plurality of body parts; receiving, from a first calibration device of the at least one calibration device, a first real-time image including the target user and a positioning information of the first calibration device by the processing device, wherein the first real-time image includes at least one first visible wearable device among the at least one wearable device; and generating a calibration parameter corresponding to each the at least one first visible wearable device by the processing device based on the first real-time image, the positioning information of the first calibration device, and the body posture.

The calibration parameter generating technology (at least including the system and the method) provided by the present disclosure can receive real-time images including the target user and positioning information of the calibration device from the calibration device in the environment to assist in generating calibration parameters corresponding to each of a plurality of wearable devices. In addition, the calibration parameter generating technology provided by the present disclosure can continuously calibrate the data of visible body parts and wearable devices through coherent sequence data through a coarse-to-fine architecture to maintain measurement consistency and improve data correctness. Since the calibration parameter generating technology provided by the present disclosure can be used to perform calibration assistance through nearby electronic devices (e.g., electronic devices with image capturing function and self-positioning function) to perform alignment of the human body and the device. Therefore, the calibration parameters of each wearable device can be accurately generated in real time, and the problem of image occlusion during calibration can be solved, the accuracy of device operation can be improved, and the user's service experience can be improved.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a calibration parameter generating system and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
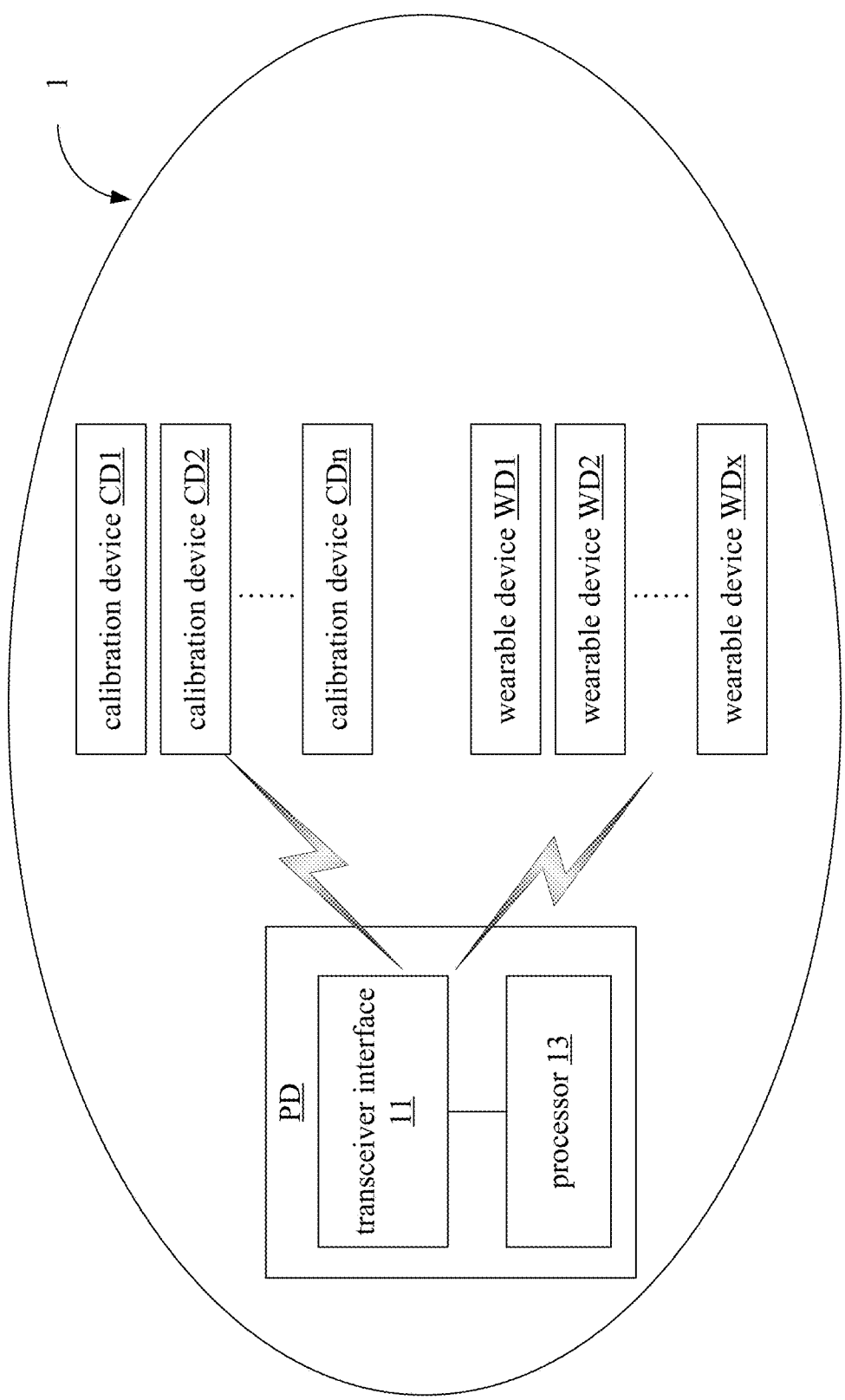
FIG. 1 is a schematic view depicting a calibration parameter generating system of the first embodiment.

First, a first embodiment of the present disclosure is a calibration parameter generating system 1 and a schematic view of which is depicted in FIG. 1. In the present embodiment, the calibration parameter generating system 1 comprises at least one or a plurality of wearable devices WD1, WD2, . . . , WDx, at least one or a plurality of calibration devices CD1, CD2, . . . , CDn, and a processing device PD, the parameter x is a positive integer, and the parameter n is a positive integer. The processing device PD can be connected to the wearable devices WD1, WD2, . . . , WDx and the correction devices CD1, CD2, . . . , CDn through wired or wireless communication.

In the present embodiment, as shown in FIG. 1, the processing device PD comprises a transceiver interface 11 and a processor 13. The processor 13 is electrically connected to the transceiver interface 11. The processing device PD is connected to the wearable devices and the calibration devices in the calibration parameter generation system 1 through communication through the transceiver interface 11.

In the present embodiment, the wearable devices WD1, WD2, . . . , WDx are configured to generate a tracking data corresponding to each of a plurality of body parts of the target user.

Figure 2A:
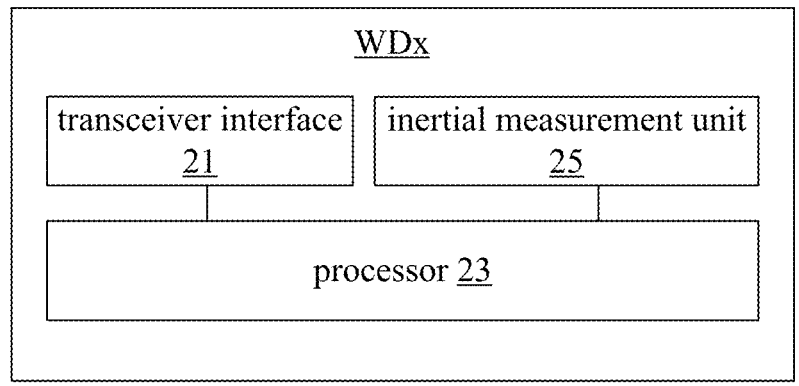
FIG. 2A is a schematic view depicting an wearable device of some embodiments.

In some embodiments, a schematic structural diagram of the wearable device WDx is depicted in FIG. 2A. The wearable device WDx comprises a transceiver interface 21, a processor 23, and an inertial measurement unit 25. The processor 23 is electrically connected to the transceiver interface 21 and the inertial measurement unit 25. The inertial measurement unit 25 may be used to detect the inertial sensing data corresponding to the body part of the target user wearing the wearable device WDx. In some embodiments, the wearable device WDx further comprises an image capture device to perform tracking operations based on the image capture function.

Specifically, the inertial measurement unit 25 may continuously generate a series of inertial sensing data (e.g., a stream of inertial sensing data generated at a frequency of 90 times per second), and each of the inertial sensing data may comprises an acceleration, an amount of rotation, and an angular acceleration. During operation, the processing device PD may periodically receive the inertial sensing data from the wearable device WDx.

In the present embodiment, the calibration devices CD1, CD2, . . . , CDn are configured to generate real-time images including a target user and positioning information of the calibration device itself.

In some embodiments, the calibration device may be a static electronic device that is installed in the environment and has an image capturing function and a self-positioning function. In some embodiments, the calibration device can also be a dynamic electronic device such as a head-mounted display (HMD), a wearable device, a controller, etc. with image capturing functions and self-positioning functions used by the target user or other users. In addition, the calibration device can be installed at different positions in the environment (for example, facing the left and right sides of the target user), and generate corresponding real-time images from a plurality of different image capture viewing angles.

Figure 2B:
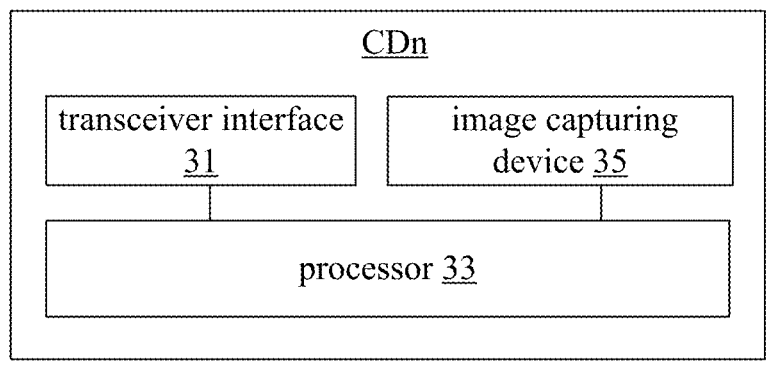
FIG. 2B is a schematic view depicting an calibration device of some embodiments.

In some embodiments, a schematic structural diagram of the calibration device CDn is depicted in FIG. 2B. The calibration device CDn comprises a transceiver interface 31, a processor 33, and an image capturing device 35. The processor 33 is electrically connected to the transceiver interface 31 and the image capturing device 35. The image capturing device 35 may comprise a plurality of image capturing units (e.g., a plurality of depth camera lenses) for capturing real-time images of body parts worn by the wearable device WDx on the target user.

In the present embodiment, the processing device PD is configured to generate a calibration parameter corresponding to each of the wearable devices WD1, WD2, . . . , WDx. For example, the processing device PD can be a head-mounted display used by the target user, and the head-mounted display generates calibration parameters to correct a plurality of wearable devices worn by the target user.

In some embodiments, the processing device PD may be disposed in other devices or combined with a device having computing capabilities (e.g., sharing a processor with other electronic devices). For example, the processing device PD can be disposed in a head-mounted display used by the target user, the processor 13 can be a processor in the head-mounted display, and the transceiver interface 11 can be a transceiver interface in the head-mounted display.

It shall be appreciated that the transceiver interface 11, 21, and 31 are an interface capable of receiving and transmitting data or other interfaces capable of receiving and transmitting data and known to those of ordinary skill in the art. The transceiver interface can receive data from sources such as external apparatuses, external web pages, external applications, and so on. The processor 13, 23, and 33 may be any of various processors, Central Processing Units (CPUs), microprocessors, digital signal processors or other computing apparatuses known to those of ordinary skill in the art. The image capturing device 35 may be image capturing devices with an image capturing function (e.g., a plurality of depth camera lenses) to generate a plurality of real-time images corresponding to a field of view (FOV) to perform a self-positioning operation of inside-out tracking.

Figure 3:
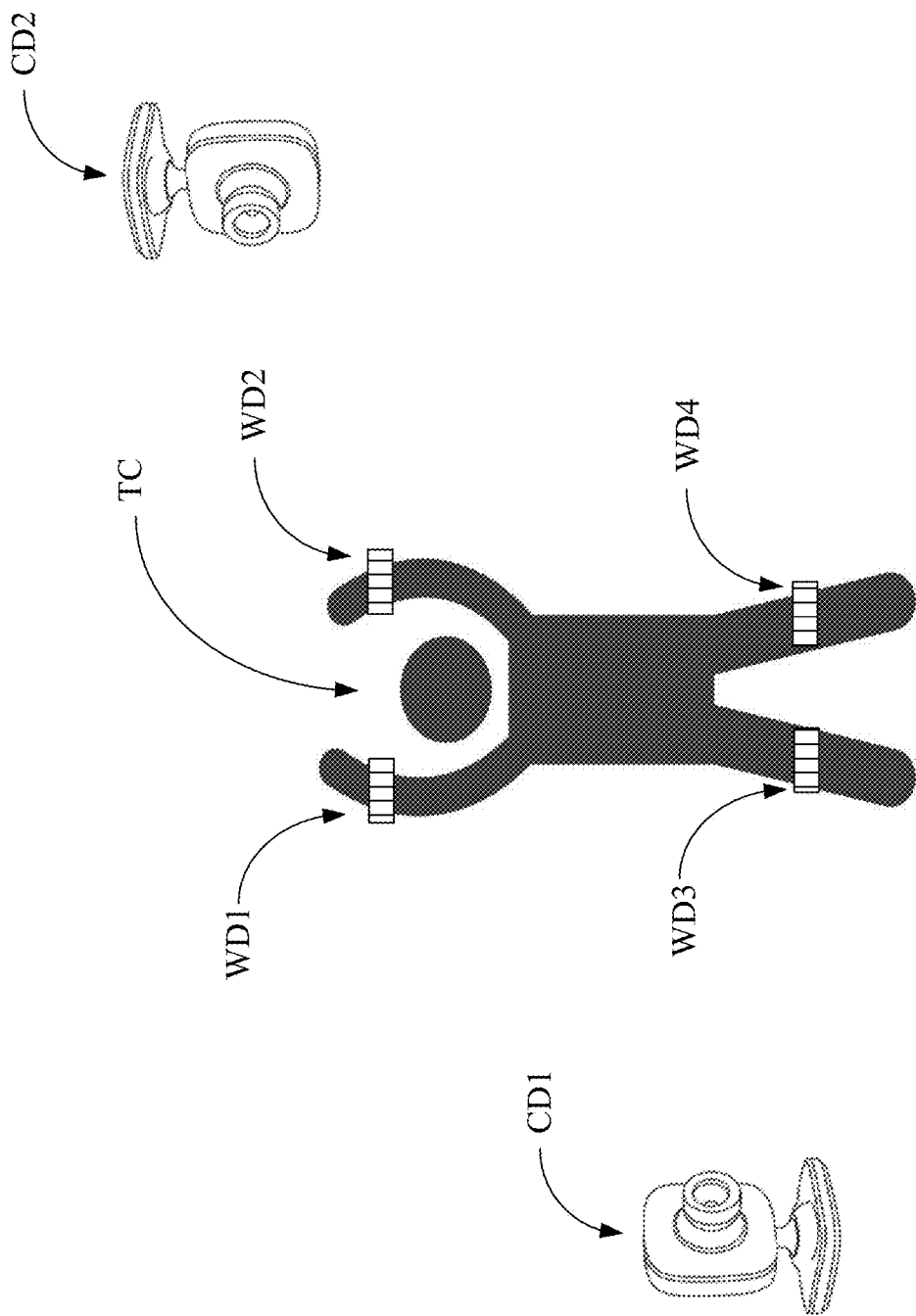
FIG. 3 is a schematic view depicting an application scenario of some embodiments.

For ease of understanding, please refer to the application scenario diagram in FIG. 3. In the present example, there are calibration devices CD1 and CD2 in the environment, and the target user TC wears the wearable devices WD1, WD2, WD3 and WD4 on the body parts of the limbs to perform interactive operations. In the present example, the wearable devices WD1, WD2, WD3 and WD4 are used to generate tracking data corresponding to the left hand, right hand, left foot, and right foot of the target user TC (e.g., the inertial sensing data), and the calibration devices CD1 and CD2 are used to generate real-time images including the target user TC.

First, in the present embodiment, the processing device PD calculates the body posture corresponding to the target user TC. Specifically, the processing device PD calculates a body posture of the target user TC based on the tracking data of each of the body parts.

Next, in the present embodiment, when a calibration device (hereinafter referred to as: the first calibration device) captures a real-time image (hereinafter referred to as: the first real-time image) including the target user TC, the processing device PD can receive the first real-time image and the positioning information of the first calibration device from the first calibration device to assist in generating calibration parameters. Specifically, the processing device PD receives, from a first calibration device of the at least one calibration device, a first real-time image including the target user TC and a positioning information of the first calibration device.

In some embodiments, the first real-time image includes at least one first visible wearable device (i.e., unobstructed wearable device) among the at least one wearable device.

In some embodiments, in order to save computing resources, the calibration device can actively determine whether to perform the operation of capturing real-time images. Specifically, the first calibration device determines whether there is a wearable device (hereinafter referred to as: the first wearable device) appearing in a field of view of the first calibration device. Then, in response to the first wearable device appearing in the field of view of the first calibration device, the first calibration device captures the first real-time image including the target user TC. Finally, the first calibration device transmits the first real-time image and the positioning information of the first calibration device to the processing device PD.

In some embodiments, the calibration device can also actively determine that when the target user TC is too far away or exceeds a certain range (e.g., the image resolution is too low), and accordingly suspends the real-time image generation operation.

In some embodiments, each the at least one calibration device performs a self-positioning operation to generate the positioning information of each the at least one calibration device.

Finally, in the present embodiment, the processing device PD generates a calibration parameter corresponding to each the at least one first visible wearable device based on the first real-time image, the positioning information of the first calibration device, and the body posture.

It shall be appreciated that since the processing device PD can obtain the positioning position of the calibration device in space (or the relative position relationship in space), the present disclosure can use the real-time image captured by the calibration device as the baseline/ground truth of the calibration operation to calculate the calibration parameters.

In some embodiments, the processing device PD can compare the current body posture calculated based on tracking data with the body posture calculated based on external real-time images to calculate the deviation of the body posture, and calculate the deviation degree of the wearable device accordingly. Specifically, the processing device PD calculates a baseline body posture based on the positioning information of the first calibration device and the first real-time image. Then, the processing device PD compares the body posture with the baseline body posture to generate the calibration parameter corresponding to each the at least one first visible wearable device.

In some embodiments, in order to make the calculation of the body posture more accurate, the processing device PD can also calibrate the body posture of other body parts (e.g., body parts without wearable devices) based on external real-time images. Specifically, the processing device PD determines at least one visible body part included in the first real-time image. Then, the processing device PD calculates a baseline body posture of each of the at least one visible body part based on the first real-time image and the positioning information of the first calibration device. Finally, the processing device PD calibrates the body posture of the at least one visible body part based on the baseline body posture of each the at least one visible body part.

In some embodiments, each the at least one wearable device is worn on one of the body parts of the target user TC. The processing device PD calibrates the tracking data of each of the body parts based on the calibration parameter of each the at least one first visible wearable device. For example, the processing device PD can calculate a corresponding transformation matrix for each wearable device, which includes information about rotation, displacement, etc. The processing device PD calibrates the tracking data for each of the body parts through a corresponding transformation matrix.

In some embodiments, the processing device PD further stores a plurality of historical body posture records corresponding to a plurality of time intervals for each body part, and calculates the body posture of the target user TC based on the historical body posture records. Therefore, even if the processing device PD does not receive a real-time image with a complete posture from the beginning to the end, the processing device PD can still continue to make the best posture prediction through the historical information of some body parts.

It shall be appreciated that the present disclosure can continuously calibrate the data of visible body parts and wearable devices through coherent sequence data (e.g., sequential model) through a coarse-to-fine operation structure.

For example, when the target user TC wearing the wearable device moves from far away to near, the observer's (i.e., the calibration device) camera can see the complete person at first, but can only see part of the body later. In this case, the present disclosure can make broad estimates (i.e., coarse) when the whole body is visible, and perform partial detailed prediction (i.e., fine) when only part of the body is visible. In addition, during operation, the newly acquired details (e.g., real-time, detailed but lacking full-body information) are optimized by taking into account past tracking information (e.g., full body information available, but rough and out of date). Accordingly, the present disclosure can continuously update complete body posture information, and then perform alignment operations between the human body and the device.

Figure 4:
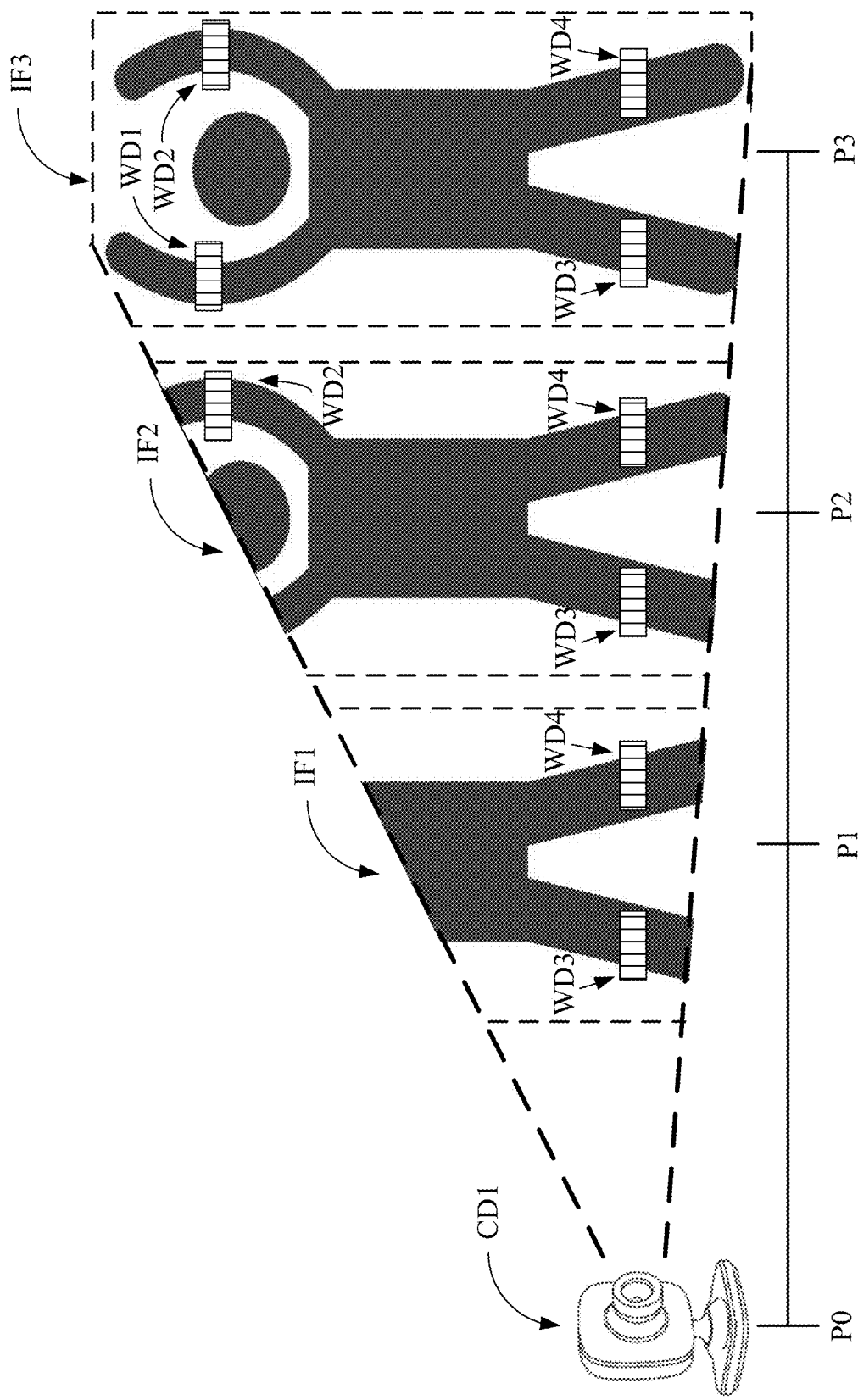
FIG. 4 is a schematic view depicting real-time images of some embodiments.

For ease of understanding, please refer to the real-time image diagram in FIG. 4. In the present example, the calibration device CD1 is located at position P0. FIG. 4 illustrates the real-time image IF1, the real-time image IF2, and the real-time image IF3 respectively generated by the calibration device CD1 when the target user TC is located at the position P1, position P2 and position P3. In the present example, since the distance between position P3 and position P0 is relatively far, the field of view range of the calibration device CD1 includes a larger body range corresponding to the target user TC. In addition, since the distance between the position P1 and the position P0 is relatively short, the field of view range of the calibration device CD1 includes a smaller body range corresponding to the target user TC.

In the present example, the real-time image IF3 includes all wearable devices of the target user TC (i.e., the wearable devices WD1, WD2, WD3, and WD4) and the complete body parts of the target user TC. The real-time image IF2 includes the target user TC's wearable device on the left hand and lower limbs (i.e., the wearable devices WD2, WD3, and WD4) and some body parts of the target user TC. The real-time image IF3 includes the target user TC's wearable device on the lower limbs (i.e., the wearable devices WD3 and WD4) and some body parts of the target user TC. In the present example, the processing device PD can perform a coherent calibration operation from coarse to fine according to the visible wearable devices. Therefore, even if part of the user's body part is blocked, the processing device PD can still make calibrations based on coherent data at different time points.

It shall be appreciated that the operations of calibrating the body posture of the body parts and the operations of generating the calibration parameters are not limited in quantity and sequence. For example, the operation of calibrating the body posture of the body part and the operation of generating the calibration parameters may be performed from multiple sources (i.e., from different calibration devices). In addition, the operation of calibrating the body posture of the body part and the operation of generating the calibration parameters can be processed simultaneously and in parallel.

In some embodiments, the processing device PD can adjust the calibration amplitude of the calibration parameter based on the resolution and confidence level of the wearable device in the real-time image. For example, when the resolution and confidence level are low, the amplitude of calibration parameter adjustment is reduced. When the resolution and confidence level are high, increase the amplitude of calibration parameter adjustment.

Specifically, the processing device PD determines an image resolution of each the at least one first visible wearable device in the first real-time image. Then, the processing device PD calculates a calibration confidence level corresponding to each the at least one first visible wearable device based on the image resolution of each the at least one first visible wearable device. Finally, the processing device PD generates the calibration parameter corresponding to each the at least one first visible wearable device based on the calibration confidence level of each the at least one first visible wearable device.

In some embodiments, when another calibration device (hereinafter referred to as: the second calibration device) captures a real-time image including the target user TC (hereinafter referred to as: the second real-time image), the processing device PD can receive the second real-time image and the positioning information of the second calibration device from the second calibration device to assist in generating calibration parameters. Specifically, the processing device PD receives, from a second calibration device of the at least one calibration device, a second real-time image including the target user TC and the positioning information of the second calibration device, wherein the second real-time image includes at least one second visible wearable device among the at least one wearable device. Then, the processing device PD generates a calibration parameter corresponding to each the at least one second visible wearable device based on the second real-time image, the positioning information of the second calibration device, and the body posture.

In some embodiments, in order to reduce the resource consumption of calibration and avoid repeated execution of calibration operations on the wearable device that has performed calibration, the at least one second visible wearable device is different from the at least one first visible wearable device.

In some embodiments, when no wearable device appears within the visible range of the calibration device (hereinafter referred to as: the third calibration device), the calibration device can still generate a real-time image (hereinafter referred to as: the third real-time image), and the processing device PD can receive the third real-time image and the positioning information of the third calibration device from the third calibration device to assist to calibrates the body posture. Specifically, the processing device PD receives from a third calibration device of the at least one calibration device, a third real-time image including the target user TC and the positioning information of the third calibration device. Next, the processing device PD determines at least one visible body part included in the third real-time image. Finally, the processing device PD calibrates the body posture of the at least one visible body part based on the first real-time image, the positioning information of the first calibration device, and the body posture.

According to the above descriptions, the calibration parameter generating system 1 provided by the present disclosure can receive real-time images including the target user and positioning information of the calibration device from the calibration device in the environment to assist in generating calibration parameters corresponding to each of a plurality of wearable devices. In addition, the calibration parameter generating system 1 provided by the present disclosure can continuously calibrate the data of visible body parts and wearable devices through coherent sequence data through a coarse-to-fine architecture to maintain measurement consistency and improve data correctness. Since the calibration parameter generating system 1 provided by the present disclosure can be used to perform calibration assistance through nearby electronic devices (e.g., electronic devices with image capturing function and self-positioning function) to perform alignment of the human body and the device. Therefore, the calibration parameters of each wearable device can be accurately generated in real time, and the problem of image occlusion during calibration can be solved, the accuracy of device operation can be improved, and the user's service experience can be improved.

Figure 5:
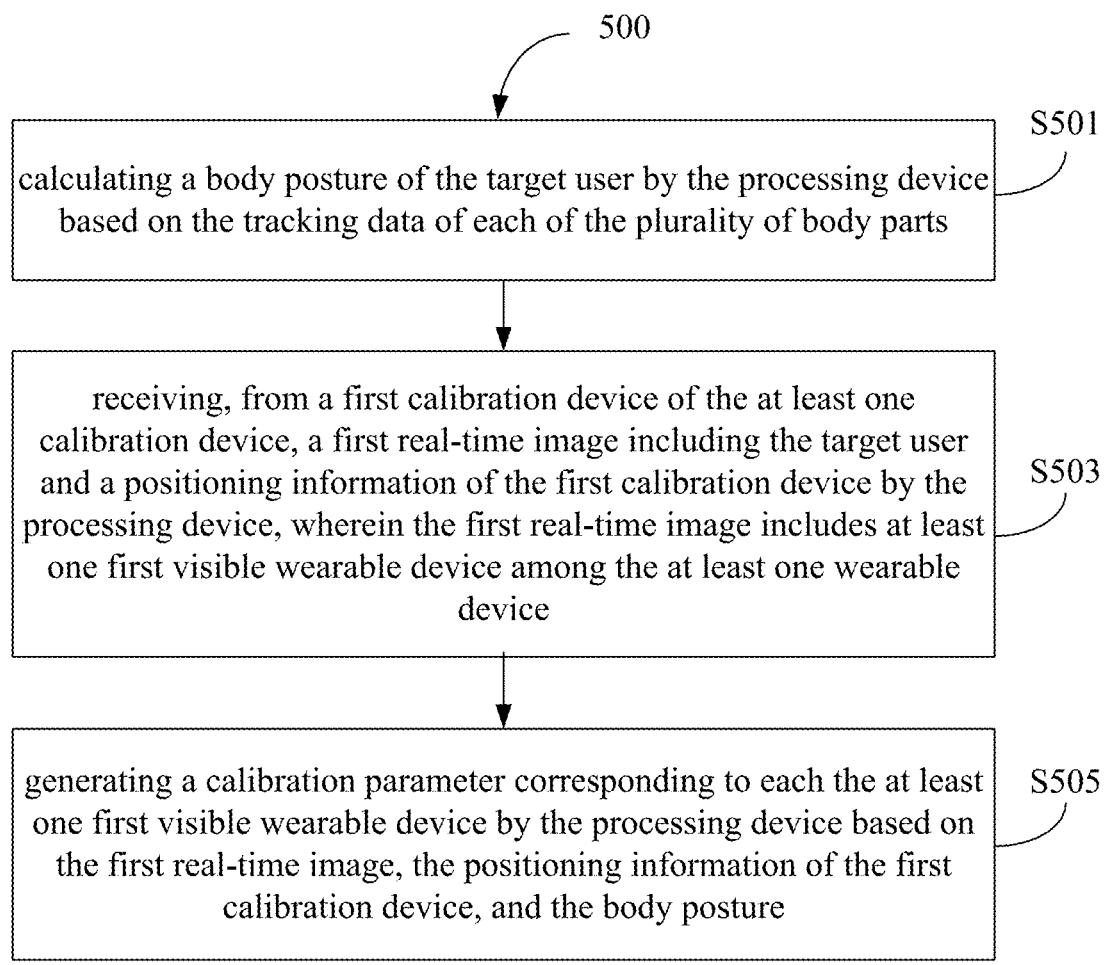
FIG. 5 is a partial flowchart depicting a calibration parameter generating method of the second embodiment.

A second embodiment of the present disclosure is a calibration parameter generating method and a flowchart thereof is depicted in FIG. 5. The calibration parameter generating method 500 is adapted for an electronic system (e.g., the calibration parameter generating system 1 of the first embodiment). The electronic system comprises at least one wearable device, at least one calibration device, and a processing device (e.g., the wearable devices WD1, WD2, . . . , WDx, the correction devices CD1, CD2, . . . , CDn, and the processing device PD of the first embodiment). The processing device is communicatively connected to the at least one wearable device and the at least one calibration device. The at least one wearable device is configured to generate a tracking data corresponding to each of a plurality of body parts of a target user. The calibration parameter generating method 500 generates calibration parameters through the steps S501 to S505.

In the step S501, the processing device calculates a body posture of the target user based on the tracking data of each of the plurality of body parts.

Next, in the step S503, the processing device receives, from a first calibration device of the at least one calibration device, a first real-time image including the target user and a positioning information of the first calibration device by the processing device, wherein the first real-time image includes at least one first visible wearable device among the at least one wearable device.

Finally, in the step S505, the processing device generates a calibration parameter corresponding to each the at least one first visible wearable device by the processing device based on the first real-time image, the positioning information of the first calibration device, and the body posture.

In some embodiments, each the at least one wearable device is worn on one of the body parts of the target user, and the calibration parameter generating method 500 further comprises the following steps: calibrating the tracking data of each of the body parts based on the calibration parameter of each the at least one first visible wearable device.

In some embodiments, the calibration parameter generating method 500 further comprises the following steps: determining, by the first calibration device, whether there is a first wearable device appearing in a field of view of the first calibration device; in response to the first wearable device appearing in the field of view of the first calibration device, capturing the first real-time image including the target user by the first calibration device; and transmitting, by the first calibration device, the first real-time image and the positioning information of the first calibration device to the processing device.

In some embodiments, the step of generating the calibration parameter corresponding to each the at least one first visible wearable device further comprises the following steps: calculating, by the processing device, a baseline body posture based on the positioning information of the first calibration device and the first real-time image; and comparing, by the processing device, the body posture with the baseline body posture to generate the calibration parameter corresponding to each the at least one first visible wearable device.

In some embodiments, the calibration parameter generating method 500 further comprises the following steps: performing, by each the at least one calibration device, a self-positioning operation to generate the positioning information of each the at least one calibration device.

In some embodiments, the calibration parameter generating method 500 further comprises the following steps: determining, by the processing device, at least one visible body part included in the first real-time image; calculating, by the processing device, a baseline body posture of each of the at least one visible body part based on the first real-time image and the positioning information of the first calibration device; and calibrating, by the processing device, the body posture of the at least one visible body part based on the baseline body posture of each the at least one visible body part.

In some embodiments, the calibration parameter generating method 500 further comprises the following steps: determining, by the processing device, an image resolution of each the at least one first visible wearable device in the first real-time image; calculating, by the processing device, a calibration confidence level corresponding to each the at least one first visible wearable device based on the image resolution of each the at least one first visible wearable device; and generating, by the processing device, the calibration parameter corresponding to each the at least one first visible wearable device based on the calibration confidence level of each the at least one first visible wearable device.

In some embodiments, the calibration parameter generating method 500 further comprises the following steps: receiving, from a second calibration device of the at least one calibration device, a second real-time image including the target user and the positioning information of the second calibration device by the processing device, wherein the second real-time image includes at least one second visible wearable device among the at least one wearable device; and generating a calibration parameter corresponding to each the at least one second visible wearable device by the processing device based on the second real-time image, the positioning information of the second calibration device, and the body posture.

In some embodiments, the at least one second visible wearable device is different from the at least one first visible wearable device.

In some embodiments, the calibration parameter generating method 500 further comprises the following steps: receiving, from a third calibration device of the at least one calibration device, a third real-time image including the target user and the positioning information of the third calibration device by the processing device; determining at least one visible body part included in the third real-time image by the processing device; and calibrating the body posture of the at least one visible body part by the processing device based on the first real-time image, the positioning information of the first calibration device, and the body posture.

In addition to the aforesaid steps, the second embodiment can also execute all the operations and steps of the calibration parameter generating system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the calibration device, the real-time image, the visible wearable device, the wearable device) are preceded by terms such as "first", "second", or "third", and these terms of "first", "second", or "third" are only used to distinguish these different words. For example, the "first" and "second" calibration device are only used to indicate the calibration device used in different operations.

According to the above descriptions, the calibration parameter generating technology (at least including the system and the method) provided by the present disclosure can receive real-time images including the target user and positioning information of the calibration device from the calibration device in the environment to assist in generating calibration parameters corresponding to each of a plurality of wearable devices. In addition, the calibration parameter generating technology provided by the present disclosure can continuously calibrate the data of visible body parts and wearable devices through coherent sequence data through a coarse-to-fine architecture to maintain measurement consistency and improve data correctness. Since the calibration parameter generating technology provided by the present disclosure can be used to perform calibration assistance through nearby electronic devices (e.g., electronic devices with image capturing function and self-positioning function) to perform alignment of the human body and the device. Therefore, the calibration parameters of each wearable device can be accurately generated in real time, and the problem of image occlusion during calibration can be solved, the accuracy of device operation can be improved, and the user's service experience can be improved.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A calibration parameter generating system, comprising:
   at least one wearable device, being configured to generate a tracking data corresponding to each of a plurality of body parts of a target user;
   at least one calibration device; and
   a processing device, being communicatively connected to the at least one wearable device and the at least one calibration device, and being configured to perform operations comprising:
      calculating a body posture of the target user based on the tracking data of each of the plurality of body parts;
      receiving, from a first calibration device of the at least one calibration device, a first real-time image including the target user and a positioning information of the first calibration device, wherein the first real-time image includes at least one first visible wearable device among the at least one wearable device; and
      generating a calibration parameter corresponding to each the at least one first visible wearable device based on the first real-time image, the positioning information of the first calibration device, and the body posture.

2. The calibration parameter generating system of claim 1, wherein each the at least one wearable device is worn on one of the body parts of the target user, and the processing device further performs the following operations:
   calibrating the tracking data of each of the body parts based on the calibration parameter of each the at least one first visible wearable device.

3. The calibration parameter generating system of claim 1, wherein the first calibration device further performs the following operations:
   determining whether there is a first wearable device appearing in a field of view of the first calibration device;
   in response to the first wearable device appearing in the field of view of the first calibration device, capturing the first real-time image including the target user; and
   transmitting the first real-time image and the positioning information of the first calibration device to the processing device.

4. The calibration parameter generating system of claim 1, wherein the operation of generating the calibration parameter corresponding to each the at least one first visible wearable device further comprises the following operations:
   calculating a baseline body posture based on the positioning information of the first calibration device and the first real-time image; and
   comparing the body posture with the baseline body posture to generate the calibration parameter corresponding to each the at least one first visible wearable device.

5. The calibration parameter generating system of claim 1, wherein the calibration parameter generating system further performs the following operations:
   performing, by each the at least one calibration device, a self-positioning operation to generate the positioning information of each the at least one calibration device.

6. The calibration parameter generating system of claim 1, wherein the processing device further performs the following operations:
   determining at least one visible body part included in the first real-time image;
   calculating a baseline body posture of each of the at least one visible body part based on the first real-time image and the positioning information of the first calibration device; and
   calibrating the body posture of the at least one visible body part based on the baseline body posture of each the at least one visible body part.

7. The calibration parameter generating system of claim 1, wherein the processing device further performs the following operations:
   determining an image resolution of each the at least one first visible wearable device in the first real-time image;
   calculating a calibration confidence level corresponding to each the at least one first visible wearable device based on the image resolution of each the at least one first visible wearable device; and
   generating the calibration parameter corresponding to each the at least one first visible wearable device based on the calibration confidence level of each the at least one first visible wearable device.

8. The calibration parameter generating system of claim 1, wherein the processing device further performs the following operations:
   receiving, from a second calibration device of the at least one calibration device, a second real-time image including the target user and the positioning information of the second calibration device, wherein the second real-time image includes at least one second visible wearable device among the at least one wearable device; and
   generating a calibration parameter corresponding to each the at least one second visible wearable device based on the second real-time image, the positioning information of the second calibration device, and the body posture.

9. The calibration parameter generating system of claim 8, wherein the at least one second visible wearable device is different from the at least one first visible wearable device.

10. The calibration parameter generating system of claim 1, wherein the processing device further performs the following operations:
    receiving, from a third calibration device of the at least one calibration device, a third real-time image including the target user and the positioning information of the third calibration device;
    determining at least one visible body part included in the third real-time image; and
    calibrating the body posture of the at least one visible body part based on the first real-time image, the positioning information of the first calibration device, and the body posture.

11. A calibration parameter generating method, being adapted for use in an electronic system, wherein the electronic system comprises at least one wearable device, at least one calibration device, and a processing device, the processing device is communicatively connected to the at least one wearable device and the at least one calibration device, the at least one wearable device is configured to generate a tracking data corresponding to each of a plurality of body parts of a target user, and the calibration parameter generating method comprises:

calculating a body posture of the target user by the processing device based on the tracking data of each of the plurality of body parts;

receiving, from a first calibration device of the at least one calibration device, a first real-time image including the target user and a positioning information of the first calibration device by the processing device, wherein the first real-time image includes at least one first visible wearable device among the at least one wearable device; and generating a calibration parameter corresponding to each the at least one first visible wearable device by the processing device based on the first real-time image, the positioning information of the first calibration device, and the body posture.

12. The calibration parameter generating method of claim 11, wherein each the at least one wearable device is worn on one of the body parts of the target user, and the calibration parameter generating method further comprises the following steps:

calibrating the tracking data of each of the body parts based on the calibration parameter of each the at least one first visible wearable device.

13. The calibration parameter generating method of claim 11, wherein the calibration parameter generating method further comprises the following steps:

determining, by the first calibration device, whether there is a first wearable device appearing in a field of view of the first calibration device;

in response to the first wearable device appearing in the field of view of the first calibration device, capturing the first real-time image including the target user by the first calibration device; and transmitting, by the first calibration device, the first real-time image and the positioning information of the first calibration device to the processing device.

14. The calibration parameter generating method of claim 11, wherein the step of generating the calibration parameter corresponding to each the at least one first visible wearable device further comprises the following steps:

calculating, by the processing device, a baseline body posture based on the positioning information of the first calibration device and the first real-time image; and comparing, by the processing device, the body posture with the baseline body posture to generate the calibration parameter corresponding to each the at least one first visible wearable device.

15. The calibration parameter generating method of claim 11, wherein the calibration parameter generating method further comprises the following steps:

performing, by each the at least one calibration device, a self-positioning operation to generate the positioning information of each the at least one calibration device.

16. The calibration parameter generating method of claim 11, wherein the calibration parameter generating method further comprises the following steps:

determining, by the processing device, at least one visible body part included in the first real-time image;

calculating, by the processing device, a baseline body posture of each of the at least one visible body part based on the first real-time image and the positioning information of the first calibration device; and calibrating, by the processing device, the body posture of the at least one visible body part based on the baseline body posture of each the at least one visible body part.

17. The calibration parameter generating method of claim 11, wherein the calibration parameter generating method further comprises the following steps:

determining, by the processing device, an image resolution of each the at least one first visible wearable device in the first real-time image;

calculating, by the processing device, a calibration confidence level corresponding to each the at least one first visible wearable device based on the image resolution of each the at least one first visible wearable device; and generating, by the processing device, the calibration parameter corresponding to each the at least one first visible wearable device based on the calibration confidence level of each the at least one first visible wearable device.

18. The calibration parameter generating method of claim 11, wherein the calibration parameter generating method further comprises the following steps:

receiving, from a second calibration device of the at least one calibration device, a second real-time image including the target user and the positioning information of the second calibration device by the processing device, wherein the second real-time image includes at least one second visible wearable device among the at least one wearable device; and generating a calibration parameter corresponding to each the at least one second visible wearable device by the processing device based on the second real-time image, the positioning information of the second calibration device, and the body posture.

19. The calibration parameter generating method of claim 18, wherein the at least one second visible wearable device is different from the at least one first visible wearable device.

20. The calibration parameter generating method of claim 11, wherein the calibration parameter generating method further comprises the following steps:

receiving, from a third calibration device of the at least one calibration device, a third real-time image including the target user and the positioning information of the third calibration device by the processing device;

determining at least one visible body part included in the third real-time image by the processing device; and calibrating the body posture of the at least one visible body part by the processing device based on the first real-time image, the positioning information of the first calibration device, and the body posture.

* * * * *